March 4, 1924.
H. W. MELLING
LATHE
Filed Sept. 27, 1922   5 Sheets-Sheet 1
1,485,687
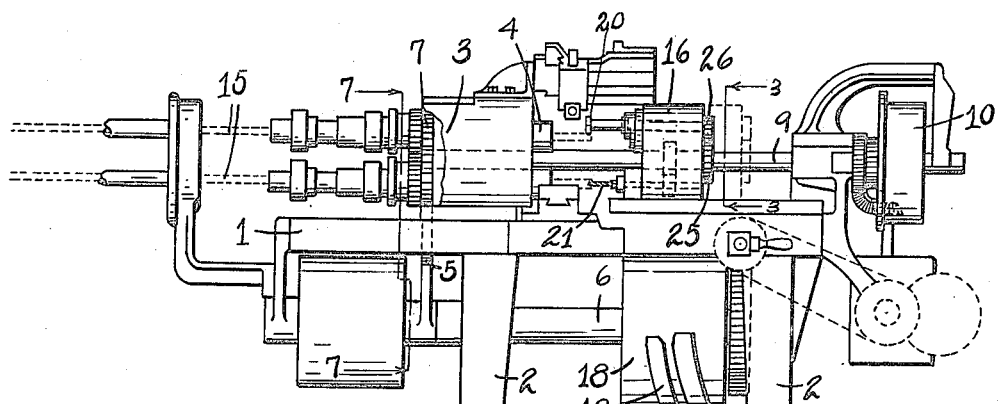
Fig. I.
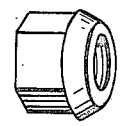
Fig. X.
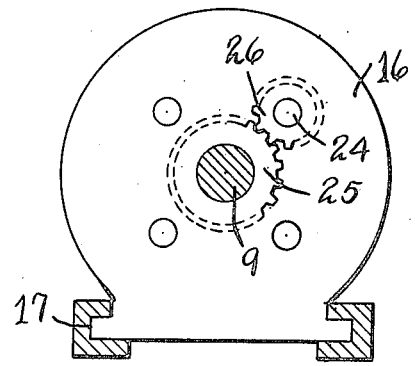
Fig. III.
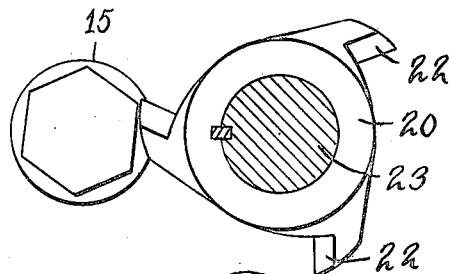
Fig. IX.
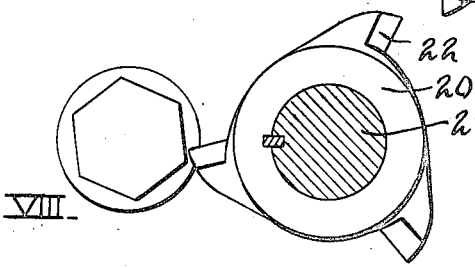
Fig. VIII.
INVENTOR.
Herman W. Melling
BY Chappell & Earl
ATTORNEYS

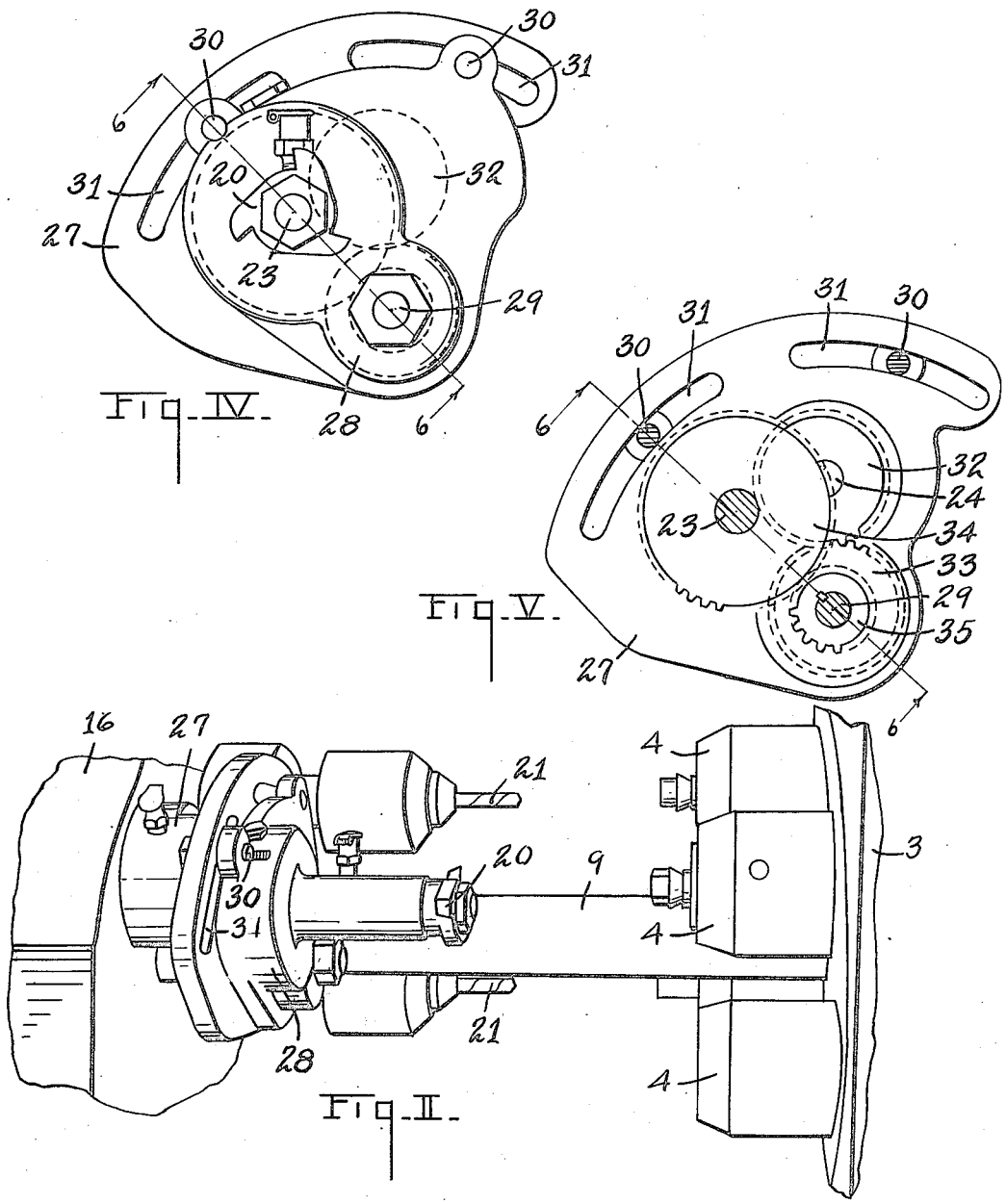

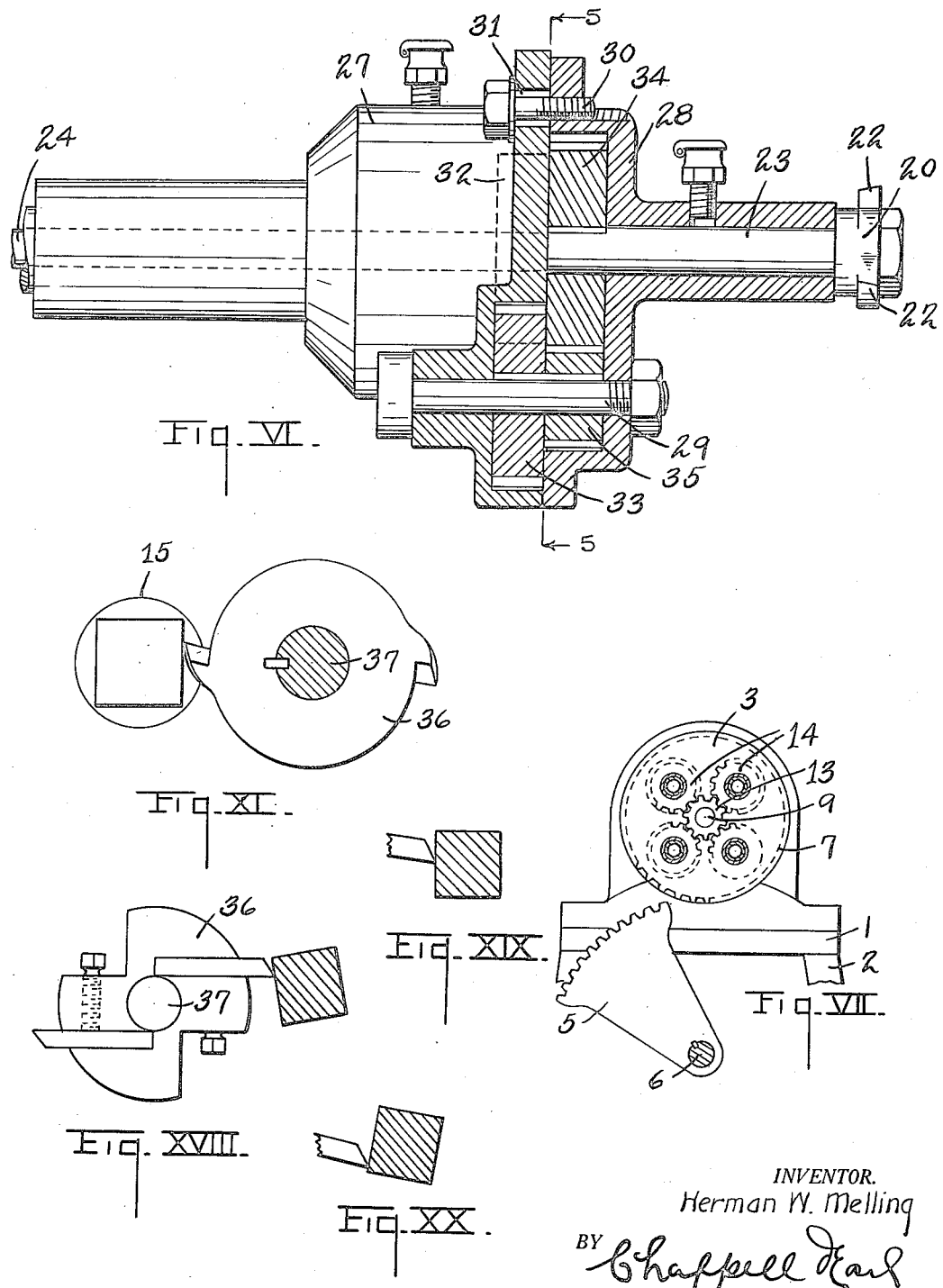

March 4, 1924.
H. W. MELLING
LATHE
Filed Sept. 27, 1922  5 Sheets-Sheet 4
1,485,687
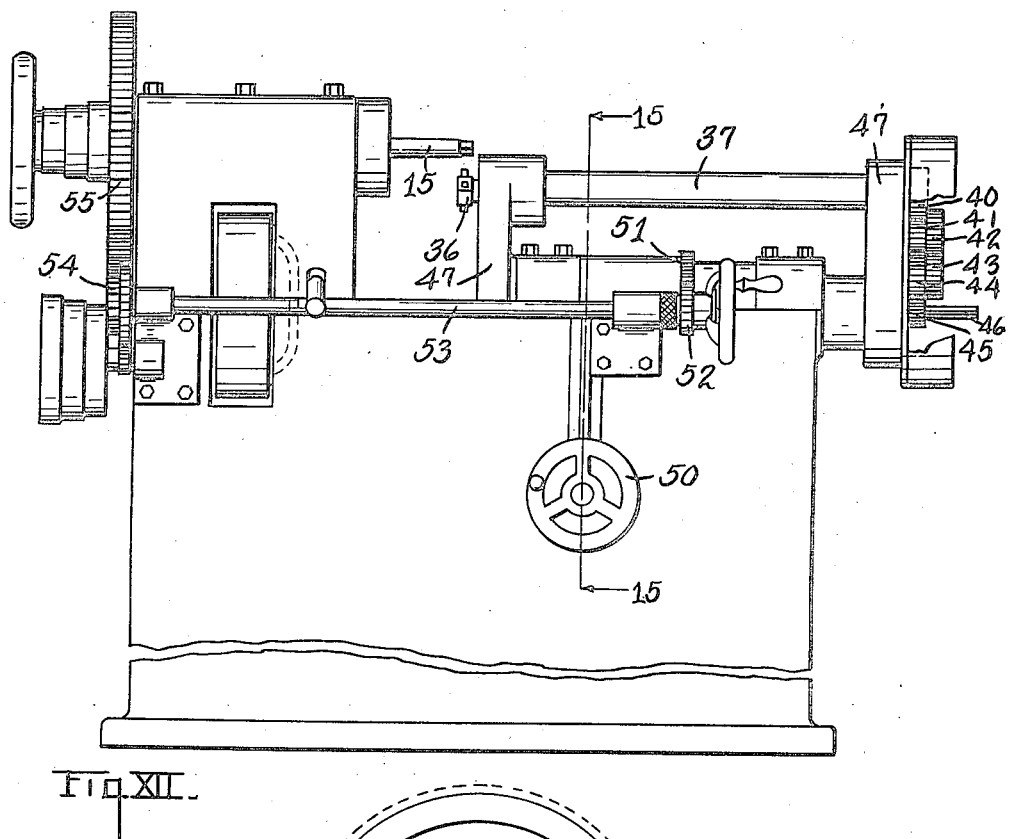
Fig. XII.
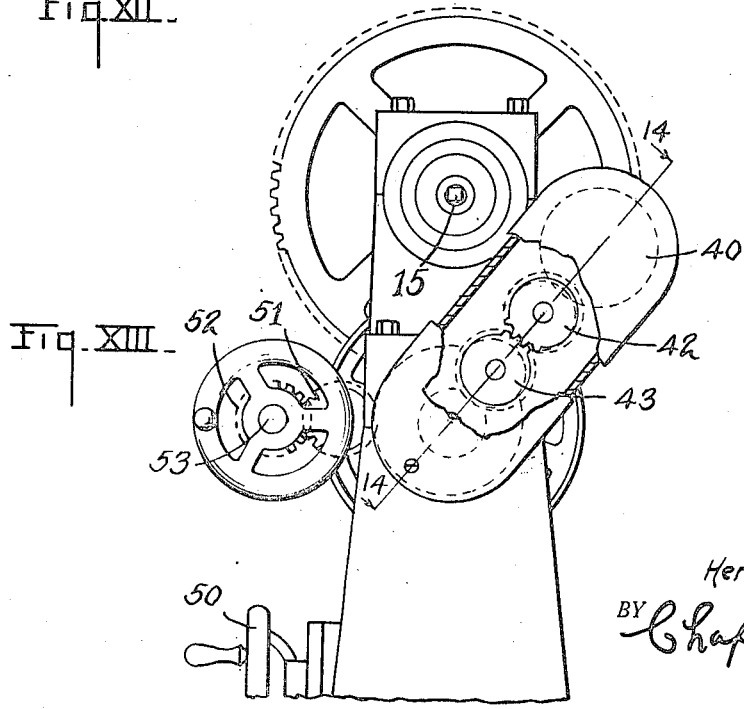
Fig. XIII.
INVENTOR.
Herman W. Melling
BY Chappell & Earl
ATTORNEYS.

March 4, 1924.
H. W. MELLING
LATHE
Filed Sept. 27, 1922    5 Sheets-Sheet 5
1,485,687
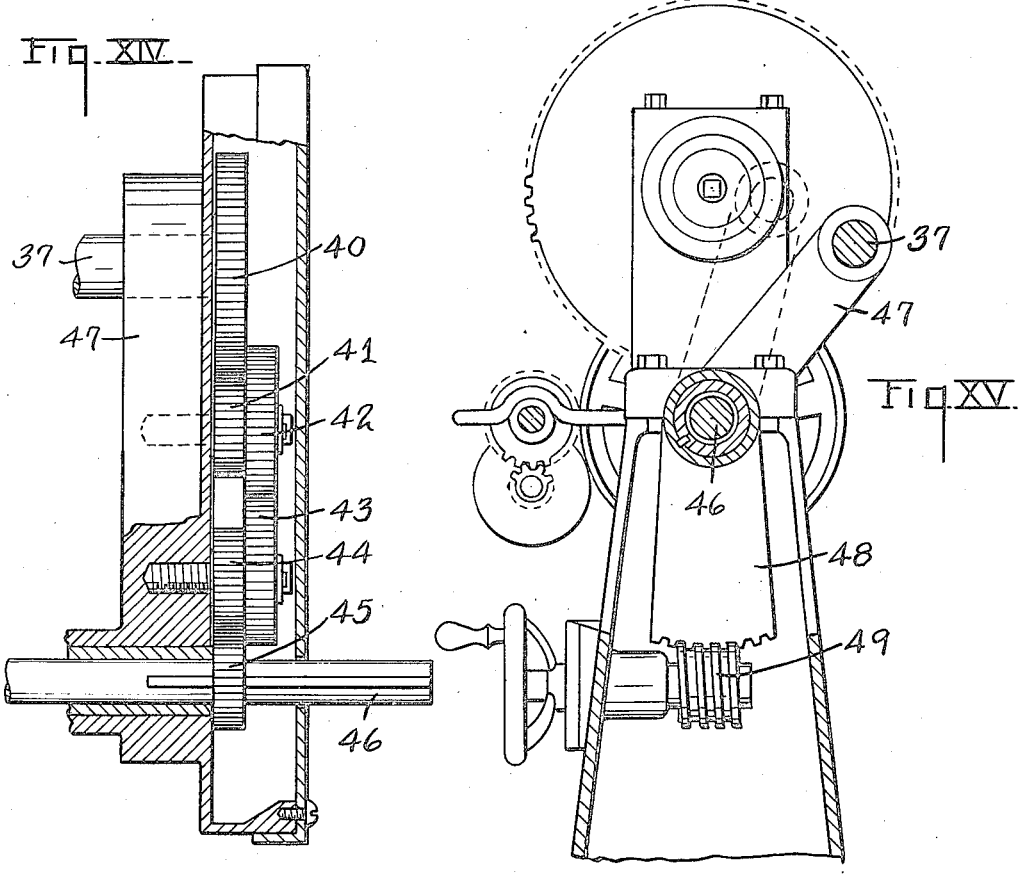
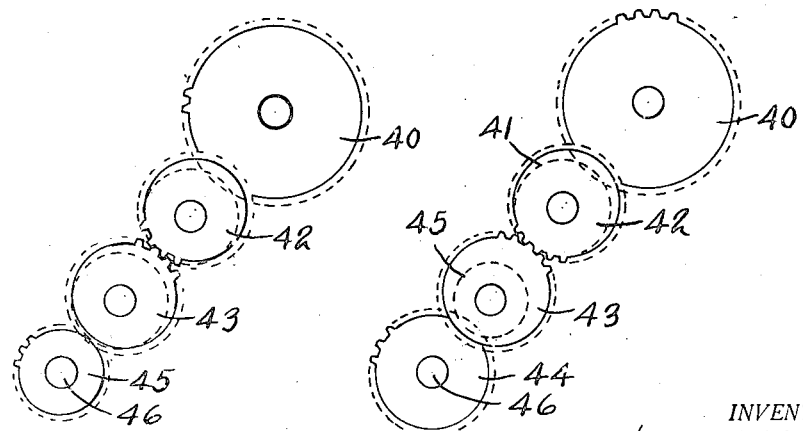
INVENTOR.
Herman W. Melling
BY Chappell & Earl
ATTORNEYS.

Patented Mar. 4, 1924.

1,485,687

UNITED STATES PATENT OFFICE.

HERMAN W. MELLING, OF JACKSON, MICHIGAN.

LATHE.

Application filed September 27, 1922. Serial No. 590,828.

*To all whom it may concern:*

Be it known that I, HERMAN W. MELLING, a citizen of the United States, residing at Jackson, county of Jackson, State of Michigan, have invented certain new and useful Improvements in Lathes, of which the following is a specification.

This invention relates to improvements in lathes.

The main object of this invention is to provide an improved lathe for the forming of polygonal objects such as hexagon nuts, square nuts, squared shafts and the like, and numerous other objects.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a fragmentary front elevation of a lathe embodying the features of my invention, parts being shown conventionally for convenience in illustration.

Fig. II is an enlarged fragmentary perspective of the cutter and work holder portions of the machine, parts being shown inversed from that appearing in Fig. I.

Fig. III is a detail vertical section on a line corresponding to line 3—3 of Fig. I, showing details of the tool carriage and driving means.

Fig. IV is an end view of one of the cutters and its driving gears removed from the cutter carriage.

Fig. V is a sectional view on a line corresponding to line 5—5 of Fig. VI.

Fig. VI is a detail view, partially in section, of one of the cutters and its driving connections removed from the cutter or tool carriage, the same being partially sectioned on a line corresponding to line 6—6 of Figs. IV and V.

Fig. VII is a detail section on a line corresponding to line 7—7 of Fig. I showing details of the work spindle drive.

Figs. VIII and IX are detail views showing the relation of the cutter to the work, the work being a hexagon nut.

Fig. X is a perspective view of the completed work or nut.

Fig. XI is a detail section showing my improved machine adapted for forming square objects.

Fig. XII is a front elevation of a modified form of my invention designed for performing a single operation upon the work.

Fig. XIII is a detail end elevation looking from the left of Fig. XII, parts being broken away for convenience in illustration.

Fig. XIV is a detail section on a line corresponding to line 14—14 of Fig. XIII showing details of the drive.

Fig. XV is a detail vertical section on a line corresponding to line 15—15 of Fig. XII.

Figs. XVI and XVII are conventional illustrations of the driving gears for the cutter shaft whereby a variable speed drive is secured therefor.

Figs. XVIII, XIX and XX are detail views showing the relation of the cutter to the work.

In the drawings the sectional views are taken looking in the direction of the little arrows at the ends of the section lines and similar numerals of reference refer to similar parts throughout the several views.

Referring to the drawing, 1 represents the bed of the machine and 2 the legs or pedestals thereof. The work turret 3 is provided with a plurality of work holders 4, there being four of these work holders in the structure illustrated. The turret is driven with a step by step movement by means of the segment 5 on the shaft 6, the segment coacting with a gear 7 on the turret, see Fig. VII.

The main driving shaft 9 is driven from a pulley 10 or other suitable means and is provided with a pinion 13 meshing with pinions 14 on the work holders 4. In the structure illustrated the stock is in the form of rods 15 indicated by dotted lines in Fig. I. The tool carriage 16 is mounted in suitable ways 17 and is moved forward to the work by the drum 18 on the shaft 6, the drum having feed cams 19 thereon. The details of this feed, however, form no part of my invention, the same being adapted to a well-known type of machine.

I have embodied my improvements in the accompanying drawing in a machine for manufacturing nuts. The tool carriage is provided with four tools, one being a cutter 20, a pair of drills 21 being illustrated and the cut-off tool not being shown.

The cutter 20 is provided with a plurality of cutter blades 22 and is carried by a cutter spindle 23 connected by a train of gears to the spindle driving shaft 24, which is connected to the main shaft 9 by means of the gears 25 on the shaft and the coacting pinion 26 on the end of the spindle driving shaft 24. The spindle driving shaft 24 is mounted in a gear box member 27 carried by the tool carriage while the cutter spindle 23 is carried by a gear box member 28. This gear box member 28 is adjustably mounted upon the gear box member 27, being supported for pivotal adjustment on the stub shaft 29 carried by the member 27. The screws 30 engaged in the segmental slots 31 secure the member 28 in its adjusted positions permitting its adjustment for proper presentation of the cutter to the work compensating for wear on the cutter, diameter of the work and the like.

The cutter spindle is connected to its driving spindle by means of the eccentric gear 32 on the shaft 24 and a coacting eccentric gear 33 on the stub shaft 29 and the gear 34 on the cutter spindle 23 which meshes with the gear or pinion 35 on the stub shaft 29 which is keyed to the gear 33. This results in a variable speed drive for the cutter spindle.

The cutter spindle is connected to the work spindle through the shaft 9, as described, and these variable speed driving gears so that they are driven in proper ratio, the ratio being varied according to the work; for instance, in forming the hexagon nuts the ratio should be two to one, the cutter having three blades. In forming square nuts, as shown in Fig. IX, the ratio should be two to one, the cutter 36 having two blades. The ratio of speed of the eccentric gears relative to the work spindle is six to one, this resulting in one period of increased speed for each revolution of the eccentric gears, the cutters having three blades. The gears are arranged to provide ratio of two to one between the cutter shaft or spindle and the work spindle. This causes the cutter to increase its speed during the actual cutting period with the result that straight or plain surfaces are produced, which would otherwise be convex. By properly timing this variable speed in relation to the number of blades of the cutters and the speed of the work and spindles polygonal work of the desired number of sides can be produced. The variable speed drive for the cutters results in producing substantially flat or plain surface cuts on the work.

The embodiment of my invention illustrated in Figs. I to XI, inclusive, is designed for the complete forming of polygonal nuts, that is, the shaping, drilling and cutting off. In the embodiment of my invention illustrated in Figs. XII to XX exclusive I show my improvements as embodied for performing only the single operation. In such modification the work spindle is suitably driven, the details of the driving means not being illustrated. The spindle 37 for the cutter 36 is driven through a train of gears 40, 41, 42, 43, 44 and 45, the gear 45 being on the spindle driving shaft 46. The gears 41 and 43 are eccentric gears thereby securing the variable speed drive for the cutter spindle. The cutter spindle 37 is carried by a swinging support 47 pivoted on the shaft 46, and has the segmental arm 48 adjusted by means of the worm 49 having a hand wheel 50.

The cutter is driven through the shaft 53 to which it is connected by the gears 51 and 52, the feed shaft being connected by the gear 54 to the gear 55 on the work spindle, thereby securing proper ratio of speed.

The machine is designed for forming square work, the cutter having two blades, and the ratio is therefore two to one. The ratio of the eccentrics is four to one relative to the work and two to one relative to the cutter.

Machines embodying the features of my invention are of large capacity. I have not illustrated other embodiments or adaptations of my invention which I contemplate, as I believe the disclosure made will enable those skilled in the art to which my invention relates to embody or adapt the same as may be desired.

Having thus described my invention what I claim as new and desire to secure by Letters Patent is:

1. In a structure of the class described, the combination with a work spindle, of a cutter spindle provided with a cutter, a spindle driving shaft, a gear box member in which said spindle driving shaft is mounted, a coacting gear box member in which said cutter spindle is mounted, a stub shaft carried by said first gear box member and constituting a pivotal support for said second gear box member, means for securing said second gear box member in its adjusted positions, a gear on said spindle disposed within said spindle gear box member, a pair of coacting eccentric gears on said driving shaft and stub shaft, there being a gear connected to said eccentric gear on said stub shaft meshing with said gear on said cutter shaft, and driving connections for said spindle driving shaft and work spindle whereby the work is acted upon by the cutter during its periods of increased speeds.

2. In a structure of the class described, the combination with a work spindle, of a cutter spindle provided with a cutter, a spindle driving shaft, a gear box member in which said spindle driving shaft is mounted, a coacting gear box member in which said cutter spindle is mounted, a stub shaft, a gear on said spindle disposed within said spindle gear box member, a pair of coacting eccentric gears on said driving shaft and stub shaft, there being a gear connected to said eccentric gear on said stub shaft meshing with said gear on said cutter shaft, and driving connections for said spindle driving shaft and work spindle whereby the work is acted upon by the cutter during its periods of increased speeds.

3. In a structure of the class described, the combination of a work spindle, a cutter spindle, a cutter on said cutter spindle, a driving shaft, a train of gears connecting said driving shaft and cutter spindle comprising a pair of coacting eccentric gears whereby said cutter spindle is driven with variable speed, and driving connections for said cutter and work spindles whereby the same are driven in the ratio of two to one and the eccentric gears are rotated in a ratio corresponding to the number of surfaces to be cut on the work.

4. In a structure of the class described, the combination of a work spindle, a cutter spindle, a three-bladed cutter on said cutter spindle, a train of driving gears for said cutter spindle is driven with variable speed, and driving connections for said cutter and work spindles whereby the same are driven at two to one ratio, and the work is acted upon by the cutter during the periods of increased speed.

5. In a structure of the class described, the combination of a work spindle, a cutter spindle, a multiple-bladed cutter on said cutter spindle, a driving shaft, a train of gears connecting said driving shaft and cutter spindle comprising coacting eccentric gears whereby said cutter spindle is driven with variable speed, and driving connections for said cutter and work spindles whereby the work is acted upon by the cutter during the periods of increased speed.

6. In a structure of the class described, the combination of a work spindle, a multiple-bladed cutter, a train of driving gears for said cutter whereby it is driven with variable speed, and driving connections for said cutter and work spindles, whereby the work is acted upon by the cutter during the periods of increased speed.

7. In a structure of the class described, the combination of a work spindle, a cutter, a train of driving gears for said cutter whereby it is driven with variable speed, and driving connections for said cutter and work spindles whereby the work is acted upon by the cutter during the periods of increased speed all coacting for the purpose specified.

8. In a structure of the class described, the combination of a work spindle, a cutter, driving means for said cutter whereby it is driven with variable speed, and driving connections for said cutter and work spindles, whereby the work is acted upon by the cutter during its periods of increased speed, all coacting for the purpose specified.

In witness whereof, I have hereunto set my hand and seal.

HERMAN W. MELLING. [L. S.]